United States Patent
Tjia

(10) Patent No.: US 7,054,975 B2
(45) Date of Patent: May 30, 2006

(54) INTERRUPT GENERATION IN A BUS SYSTEM

(75) Inventor: Jerome Tjia, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 536 days.

(21) Appl. No.: 10/040,180

(22) Filed: Oct. 23, 2001

(65) Prior Publication Data

US 2003/0033469 A1    Feb. 13, 2003

(30) Foreign Application Priority Data

Aug. 10, 2001   (WO) .................... PCT/SG01/00162

(51) Int. Cl.
*G06F 13/24* (2006.01)

(52) U.S. Cl. ...................... 710/263; 710/260; 710/242; 710/266

(58) Field of Classification Search ................ 710/310, 710/260–266, 107, 240–244
See application file for complete search history.

(56) References Cited

U.S. PATENT DOCUMENTS

| | | | | |
|---|---|---|---|---|
| 5,404,535 | A | | 4/1995 | Barlow et al. ............... 395/725 |
| 5,692,200 | A | * | 11/1997 | Carlson et al. ............. 710/262 |
| 5,931,936 | A | * | 8/1999 | Chung et al. ............... 710/263 |
| 5,974,486 | A | * | 10/1999 | Siddappa ..................... 710/53 |
| 6,073,205 | A | * | 6/2000 | Thomson .................... 711/100 |
| 6,218,969 | B1 | * | 4/2001 | Watson et al. .............. 341/100 |
| 6,311,294 | B1 | * | 10/2001 | Larky et al. .................. 714/44 |
| 6,393,493 | B1 | * | 5/2002 | Madden et al. ............. 719/321 |
| 2001/0027502 | A1 | * | 10/2001 | Bronson et al. ............ 710/112 |
| 2002/0042856 | A1 | * | 4/2002 | Hartwell et al. ............ 710/263 |
| 2003/0028697 | A1 | * | 2/2003 | Nguyen ...................... 710/260 |

\* cited by examiner

*Primary Examiner*—Rehana Perveen
*Assistant Examiner*—Kim T. Huynh
(74) *Attorney, Agent, or Firm*—Peter Zawilski

(57) ABSTRACT

The present invention relates to a bus system comprising a first and second station (10, 14) coupled via a bus (12) for transferring data and control signals, the bus (12) operating according to a protocol in which the first station (10) repeatedly sends requests (200, 210, 220, 230) for data to the second station, the second station (14) responding to each request (200, 210, 220, 230) by sending a message with a data item or sending a negative acknowledge signal (24), wherein the second station (14) comprises:
  an interruptable processor (15) for generating data items;
  a first in first out buffer (160) coupled between the processor (15) and the bus (12), for buffering data items for successive messages in a first in first out order, the processor (15) being programmed to start writing the data items to the buffer (160) in response to an interrupt (204, 234);
  a bus interface (162) arranged to handle the protocol, sending data items from the buffer (160) in the messages, the bus interface (162) sending an interrupt to the processor (15) in response to selected ones of the requests (200, 210, 220, 230), when the buffer is empty and no interrupts have yet been generated since the processor has written into the buffer.

9 Claims, 2 Drawing Sheets

INTERRUPT GENERATION IN A BUS SYSTEM

Figure 1:
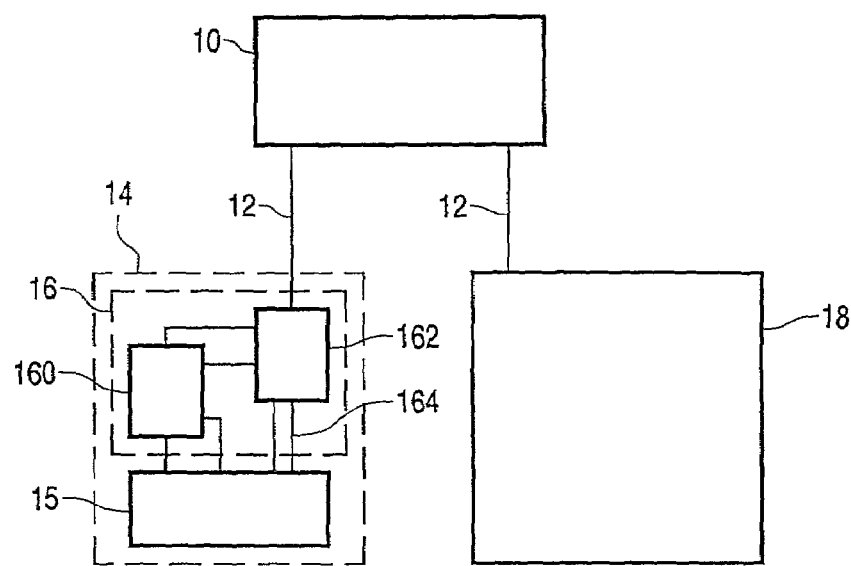

The invention relates to a bus system, a station for such a bus system and to an integrated circuit with an interface for use in such a station.

In a bus system like a USB system, electronic stations are connected via a bus. One station, called the host, communicates with other stations called devices. The devices are arranged to transmit data to the host, for example data from sensors such as a webcam or a microphone. In the USB bus system the stations may be of very diverse nature, some producing data at a high rate some at a very slow rate, some producing data almost continuously, and some only incidentally. This makes it difficult to design bus interfaces that optimally satisfy the needs of different stations.

In the USB bus systems transmission is controlled from the host with a protocol where the host repeatedly sends an "in-token" to a device. The in-token indicates a request for data. To each request for data the device responds by sending a message with data or by sending a NACK signal (Negative ACKnowledge) to indicate that no data can (yet) be sent.

The device preferably contains a processor which gathers and sends the data. The processor only needs to do so when the host has indicated that it needs (or will need) data. The processor has to detect this by means of interrupts or by polling. Polling requires the processor to loop through a program that tests for a request for data. As an alternative to polling by the processor an interrupt is sent to the processor in response to a request for data from the host. The processor reacts to the interrupt by starting execution of an interrupt routine that produces the data for the message to the host. Because the data is produced on an interrupt basis, rather than from a polling program, the processor is used more efficiently compared to polling.

However, interrupt handling usually still causes execution of a considerable number of overhead instructions. This can be detrimental to the rate at which data is transported via the bus, especially if the host sends requests for data at a higher rate than the processor is able to produce data. It is desirable to reduce the amount of overhead caused by requests for data from the host.

The use of interrupts as a mechanism to control operation of a processor is of course well known. U.S. Pat. No. 5,404,535 for example describes an interrupt mechanism which reduces the number of interrupt signals by means of an acknowledge/not acknowledge protocol, in which the processor receives interrupts and acknowledges when it will handle the interrupts.

An alternative design uses a first in first out (FIFO) buffer between the processor and the bus. A FIFO buffer is used normally when a continuing stream of data has to be transferred between a source and receiver and the points in time at which the source and receiver can write and read the data fluctuate relative to one another.

Applied in a bus interface between the processor and the bus to the host, the FIFO buffer allows the processor to work ahead of requests from the host. The bus interface runs in parallel with the processor and is arranged to receive requests for data from the host. In response to the requests the bus interface transmits data items from the buffer one after the other each time when the host has sent a request for data. If the buffer is empty at that time the bus interface sends a NACK signal. Of course the processor will have to stop writing data temporarily when the FIFO buffer is full. It may be restarted when the FIFO buffer is empty, or when the degree of filling of the FIFO buffer drops below a threshold level. The restart may be implemented using polling or interrupts.

This works well for a continuing stream of data. But when the FIFO buffer is applied in a bus system that does not necessarily transfer a continuing data stream, a mechanism is still needed to ensure that it puts data items in the FIFO buffer only if they are needed by the host. The processor should not start or resume filling the FIFO buffer merely because it is empty, because the host might need no more data. The processor has to start or resume filling only when it has information that the host needs or still needs data. To receive such information the processor still has to poll information or handle interrupts that are based on requests by the host. This requires overhead.

Amongst others, it is an object of the invention to reduce the amount of overhead needed to transport data from a processor in a station of a bus system to another station of the bus system.

The invention provides for a bus system according to claim 1. According to the invention, the bus interface handles requests for data from the second station, such as the host of a USB bus system, and passes interrupts to the processor in response to the requests when the FIFO buffer is empty, but only the first time after the buffer has become empty. In this way, the interrupts allow the processor to respond only when the host actively needs data, but at the same time the number of interrupts is minimized, because successive interrupts are not generated when the host requests data a second and further time after the buffer has become empty. Thus, no excessive overhead is created for the processor when the host requests data at a higher rate than the processor can produce it.

In an embodiment the bus interface also generates interrupts when the host acknowledges receipt of a message. That is, in this embodiment part of the interrupts are generated in response to requests (in case of an empty buffer) and part in response to acknowledgements. Thus, the filling of the FIFO buffer can start again each time data has been successfully read.

The bus interface with FIFO buffer is useful for the construction of an integrated circuit for connection between a bus connection and another integrated circuit or circuits that contain the processor, especially if the integrated circuit has to be designed so that it efficiently supports various types of these other integrated circuit that differ in data rate and processing speed. The interface uses the FIFO buffer in combination with an interrupt generating message that responds to requests for data by generating interrupts selectively, if the buffer is empty only if no interrupt was generated since data was written into the FIFO buffer. Thus the integrated circuit is able to provide an efficient interface for very diverse bus stations, for use under conditions with various rates of requests for data and processors with various speeds.

These and other objects and advantageous aspects of the bus system, station and bus interface according to the invention will become apparent from the description of the following figures.

Figure 2:
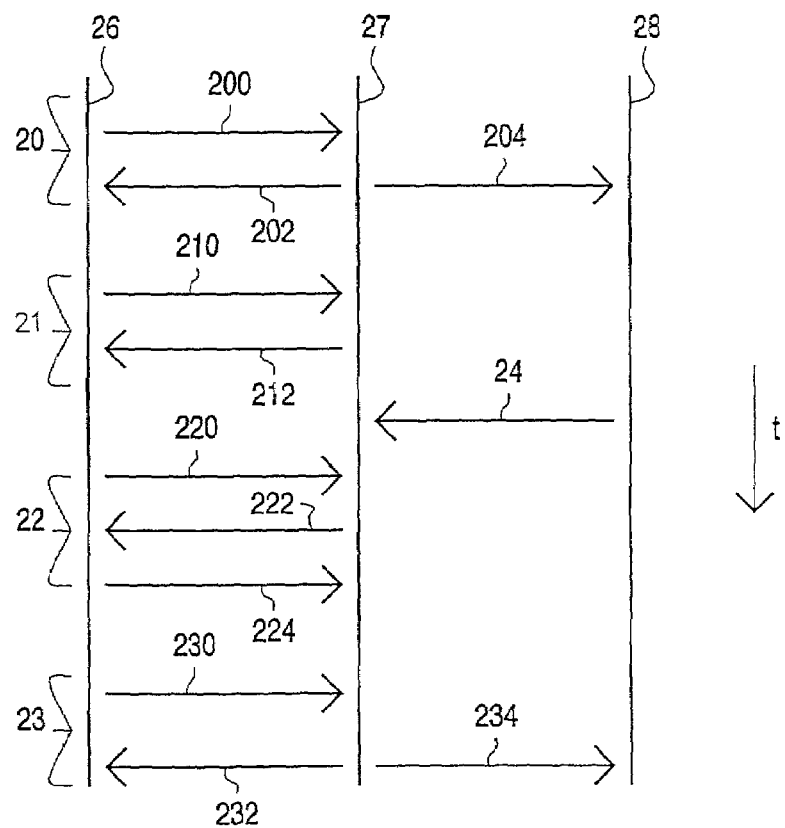
Figure 3:
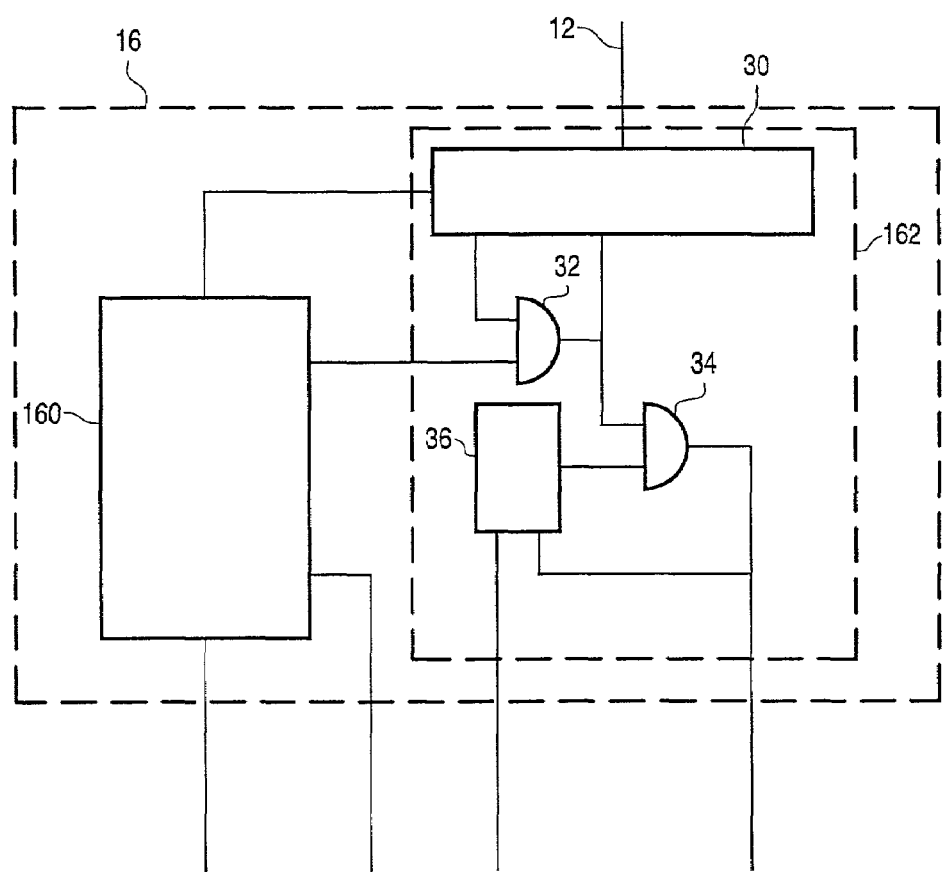

FIG. 1 shows a bus system;
FIG. 2 shows transactions for data transmission;
FIG. 3 shows a bus interface.

FIG. 1 shows a bus system with a host 10 and first and second device 14, 18 that are connected to the host 10 via bus connections 12. The first device 14 is shown in more detail. It contains a processor 15 and a bus interface 16. The bus interface contains a FIFO buffer and a controller 162.

The controller 162 is coupled to an output of the FIFO buffer 160 and the bus connection 12. The controller has an interrupt connection 164 to processor 15. Processor 15 is coupled to FIFO buffer 160 and controller 162.

FIG. 2 illustrates the operation of the system of FIG. 1. The figure illustrates the supply of messages with data from device 14 supplies to host 10 in reply to intokens from host 10. Time runs from top to bottom. Information exchange between the host 10 and the bus interface 16 is symbolized by arrows between a first vertical line 26 and a second vertical line 27. Information exchange between bus interface 16 and processor 15 is symbolized by arrows between the second vertical line and a third vertical line 28.

FIG. 1 shows a first transaction 20, in which host 10 performs transmission 200 sending an "in-token" to bus interface 16. Assuming that the FIFO buffer 160 is empty, bus interface 16 replies with a transmission 202 returning a NACK signal. The host 10 then performs a second transaction 21, again performing a transmission 210 of an in-token, to which the bus interface 16 replies with a transmission 212 of a NACK signal.

These transactions repeat until the bus interface finds that the FIFO buffer 160 is not empty. In that case, a third transaction 22 occurs in which the bus interface replies to a transmission 220 of an in-token from the host 10 by a transmission 222 of a message with data from the FIFO buffer 160, thus reducing the degree of filling of the FIFO buffer 160. In reply to this message the host 10 performs a transmission 224 of an acknowledge signal. This type of third transaction 22 repeats when the host sends in-tokens, as long as FIFO buffer 160 has not become empty.

If at some time the FIFO buffer 160 has become empty when the host 10 sends another in token, a fourth transaction 23 will occur that is similar to the first transaction 20 and so on.

So far, only the communication between the host 10 and the bus interface 16 during the transactions 20, 21, 22, 24 has been discussed. However, during the transactions 20, 21, 22, 24 bus interface 16 may also communicate with processor 14. Bus interface 16 sends interrupts 204, 234 to processor 15 in certain transactions 20, 23. In response to the interrupt 204, 234, processor 15 will execute an interrupt routine in which processor 15 generates on or more data items, for transmission via bus 12 in one or more messages, and processor 15 performs one or more transactions 24 in which it writes those data items into FIFO buffer 160.

Bus interface 16 does not send interrupts in all transactions. In particular, bus interface 16 sends interrupts 204, 234 to processor 15 in transactions 20, 23 in which bus interface 16 has to perform a transmission 202, 232 of a NACK signal to the host 10, but only if the processor 15 has written data into FIFO buffer 160 since the last transaction 20, 21, 23 in which the bus interface has sent a NACK signal. That is, bus interface 16 will send interrupts 204, 234 to the processor 15 only once in successive transactions 20, 21, 23 during a time interval in which the FIFO buffer 160 remains empty. Thus, it is realized that processor 15 is enabled to write data into FIFO buffer 160 only when the host has indicated that it will need data, while at the same time generating a minimal number of interrupts 204, 234 to the processor 15.

In an embodiment bus interface 16 additionally sends interrupts in response to transmission of acknowledge signals 224 from the host 10. In response to these interrupts the processor 15 will write new data to the FIFO buffer 160. Thus, it is not necessary for processor 15 to wait until a NACK occurs before it starts filling the FIFO buffer 160 again.

In a further embodiment, bus interface 16 even disables interrupts on NACK completely after the first NACK has occurred. This minimizes the number of interrupts. In this further embodiment no interrupt will occur in fourth transaction 23. That is, after the interrupt on the first NACK bus interface enters a state in which no interrupts are generated on NACK even if the FIFO buffer 160 has been filled in between. Thus, bus interface 16 has two states: an initial state in which an interrupt is generated on NACK and a next state in which no interrupts are generated in NACK. Bus interface 16 will enter the next state when a NACK occurs and will return to the initial state when processor 15 signals bus interface 16 to return to it initial state, for example when the processor 15 has detected an end of a block of messages.

Of course, in another embodiment bus interface 16 may still generate interrupts on each NACK after data has been written into the FIFO buffer 160. This reduces the risk of deadlock if processor 15 misses an acknowledgement from host 10. In yet another embodiment, it may be left to a program in processor 15 to switch the bus interface 16 between modes in which interrupts are generated on acknowledge from host 10 and NACK from bus interface 16 respectively. Thus, for example, the processor 15 can switch bus interface 16 to the mode in which interrupts are generated on first NACK when the processor is in a waiting state and switch bus interface 16 to the mode in which interrupts are generated on acknowledge when the processor 15 is has started processing a block of transactions.

FIG. 3 shows a simple embodiment of a bus interface 16 that realizes this function. The bus interface 16 contains FIFO buffer 160 and controller 162. Controller contains an interface unit 30, first and second AND gates 32, 34 and memory 36. Interface unit 30 is coupled to the bus connection 12 and to FIFO buffer 160, for reading data from the FIFO buffer 160. Interface unit has an output coupled to an input of first AND gate 32, for signaling receipt of an "in-token" from bus connection 12. First AND gate 32 has a second input coupled to an "empty" signal output of FIFO buffer 160. First AND gate 32 has an output coupled to interface unit 30 for giving instruction to send a NACK signal. The output of first AND gate 32 is coupled to an input of second AND gate 34. Second AND gate 34 has an output coupled to a reset input of memory 36. The output of second AND gate 34 is also coupled to the interrupt line 164 of processor 15. Memory 36 has an output coupled to an input of second AND gate 34. Memory 36 has a set input coupled to a connection for processor 15 (not shown).

In operation, processor 15 resets memory 36 when it writes data to FIFO buffer 160. As a result second AND gate 34 is enabled to pass interrupt signals to processor 15 when the output of first AND gate 32 signals that interface unit 30 should send a NACK signal to host 10 (when the FIFO buffer 160 is empty and an in-token is received from host 10). When second and gate 34 generates the interrupt it will reset memory 36 (preferably on a clock signal not shown). As a result, no interrupts will be generated by second AND gate 34 on subsequent NACK signals.

It will be appreciated that, although FIG. 3 shows the bus interface 16 in terms of simple circuits, in practice the bus interface 16 may contain its own micro-controller or other processing circuitry to perform the required functions, using for example a location in an addressable memory to store the information of buffer 160 and an ALU to perform the functions of the AND gates 32, 34.

It will also be appreciated that, although a mode of operation has been described in which interrupts are generated only in response to requests when data has been written into the FIFO buffer 160 since a previous request, the bus interface 16 may be arranged to operate in a selected one of a number of modes, including for example a mode in which interrupts are generated each time in response to a request when the buffer 160 is empty, and/or in a mode where interrupts are generated on each request, irrespective of the content of the buffer 160. Preferably the mode of operation is selectable, for example under an be set by processor 15. Thus, it is possible to select the most appropriate mode, depending on the requirements of the processor 15.

The invention claimed is:

1. A bus system comprising a first and second station coupled via a bus for transferring data and control signals, the bus operating according to a protocol in which the first station repeatedly sends requests for data to the second station, the second station responding to each request by sending a message with a data item or sending a negative acknowledge signal, wherein the second station comprises:
   an interruptable processor for generating data items;
   a first in first out buffer coupled between the processor and the bus, for buffering data items for successive messages in a first in first out order, the processor being programmed to start writing the data items to the buffer in response to an interrupt;
   a bus interface arranged to handle the protocol, sending data items from the buffer in the messages, the bus interface determining to send an interrupt to the processor in response to selected ones of the requests, as a function of whether the buffer is empty and whether interrupts have yet been generated since the processor has written into the buffer.

2. A bus system according to claim 1, wherein the bus system is a USB bus system.

3. A bus system according to claim 1, wherein the bus interface is arranged generate an interrupt signal in response to an acknowledge signal from the first station after sending the message.

4. A bus interface integrated circuit, comprising:
   a connection for a bus;
   a first in first out buffer;
   an interrupt output for applying an interrupt to a processor;
   a controller arranged to receive requests for data from the connection, and to respond to the requests by sending a message containing a data item from the buffer if the buffer is not empty, or by sending a negative acknowledge signal to the connection if the buffer is empty and to send an interrupt signal to the interrupt output when the buffer is empty on receiving one of the requests, but only if no interrupt has yet been sent since data has been written into the buffer.

5. An integrated circuit according to claim 4, arranged to generate an interrupt signal in response to an acknowledge signal from the bus after sending the message.

6. An integrated circuit according to claim 4, arranged to be switchable between a plurality of modes of operation, the integrated circuit generating the interrupt signal to the interrupt output when the buffer is empty on receiving one of the requests, but only if no interrupt has yet been sent since data has been written into the buffer in a first one of the modes, the integrated circuit generating an interrupt signal in response to an acknowledge signal from the bus after sending the message in a second one of the modes.

7. An integrated circuit according to claim 4, arranged to be switchable between a plurality of modes of operation, the integrated circuit generating said interrupt signal in response to each request for data when the buffer is empty in a first one of the modes, the integrated circuit generating the interrupt signal to the interrupt output when the buffer is empty on receiving one of the requests, but only if no interrupt has yet been sent since data has been written into the buffer in a second one of the modes.

8. A station for connection to a bus, the station comprising:
   a connection for a bus;
   a processor;
   a first in first out buffer;
   an interrupt output coupled to the processor;
   a controller arranged to receive requests for data from the connection, and to respond to the requests by sending a message containing a data item from the buffer if the buffer is not empty, or by sending a negative acknowledge signal to the connection if the buffer is empty and to send an interrupt signal to the interrupt output when the buffer is empty on receiving one of the requests, but only if no interrupt has yet been sent since data has been written into the buffer.

9. A station for connection to a bus according to claim 8, arranged to operate as a USB station.

* * * * *